United States Patent
Marella et al.

(10) Patent No.: US 11,492,043 B2
(45) Date of Patent: Nov. 8, 2022

(54) LOAD MEMBER FOR SMALL OVERLAP FRONTAL IMPACT

(71) Applicant: GM GLOBAL TECHNOLOGY OPERATIONS LLC, Detroit, MI (US)

(72) Inventors: Manoj Marella, Karnataka (IN); Bradley W. Enyeart, Milford, MI (US); Zohir Molhem, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 196 days.

(21) Appl. No.: 16/950,982

(22) Filed: Nov. 18, 2020

(65) Prior Publication Data

US 2022/0153350 A1 May 19, 2022

(51) Int. Cl.
  *B62D 21/15* (2006.01)
  *B62D 21/11* (2006.01)
  *B60G 7/00* (2006.01)

(52) U.S. Cl.
  CPC ........... *B62D 21/152* (2013.01); *B60G 7/008* (2013.01); *B62D 21/11* (2013.01); *B60G 2204/143* (2013.01); *B60G 2204/41* (2013.01); *B60G 2204/4302* (2013.01)

(58) Field of Classification Search
  CPC ....... B62D 21/152; B62D 21/11; B60G 7/008
  See application file for complete search history.

(56) References Cited

U.S. PATENT DOCUMENTS

| | | | |
|---|---|---|---|
| 10,328,976 B2 * | 6/2019 | Isakiewitsch | B62D 21/155 |
| 2019/0077207 A1 * | 3/2019 | Kanamaru | B60G 7/001 |
| 2020/0001928 A1 * | 1/2020 | Ota | B62D 21/152 |
| 2020/0102014 A1 * | 4/2020 | Sakai | B62D 21/07 |

* cited by examiner

*Primary Examiner* — James A English
*Assistant Examiner* — Matthew James O'Neill
(74) *Attorney, Agent, or Firm* — Quinn IP Law

(57) ABSTRACT

A structural arrangement for a vehicle includes a vehicle frame including a first frame member and a second frame member coupled to the first frame member. The vehicle frame extends along a vehicle body axis. The vehicle frame includes a suspension component including a control arm, a bushing, a bolt coupling the suspension component to the second frame member, and a load member coupled to the first frame member at a first attachment point and coupled to the second frame member at a second attachment point. The load member extends generally longitudinally along the vehicle body axis. The suspension component is coupled to the second frame member at the second attachment point and is detachable from the second frame member upon application of a load to the vehicle due to an impact event.

21 Claims, 5 Drawing Sheets

LOAD MEMBER FOR SMALL OVERLAP FRONTAL IMPACT

INTRODUCTION

The present disclosure relates generally to a load member for deflecting loads imparted by small overlap frontal impact events to a vehicle.

Vehicle manufacturers use a variety of structures and components to transfer energy throughout the vehicle structure to protect the vehicle components and a vehicle's occupants during a collision. Frequently, additional structural members are used to buttress the vehicle body structure, as well as for supporting various chassis and powertrain subsystems. However, additional structural members add weight and complexity to the vehicle structure.

SUMMARY

Embodiments according to the present disclosure provide a number of advantages. For example, embodiments according to the present disclosure enable efficient means of load transfer resulting from a small overlap frontal impact using a load member that transfers load from the frame to a suspension component attachment point, enable separation of the suspension component at the attachment point to reduce vehicle intrusions and increase vehicle performance robustness in small overlap frontal impact events.

In an embodiment of the present disclosure, a structural arrangement for a vehicle includes a vehicle frame including a first frame member and a second frame member coupled to the first frame member. The vehicle frame extends along a vehicle body axis. The vehicle frame includes a suspension component including a control arm, a bushing, a bolt coupling the suspension component to the second frame member, and a load member coupled to the first frame member at a first attachment point and coupled to the second frame member at a second attachment point. The load member extends generally longitudinally along the vehicle body axis. The suspension component is coupled to the second frame member at the second attachment point and is detachable from the second frame member upon application of a load to the vehicle due to an impact event.

In some aspects, the load member defines a load path between the first frame member and the bushing of the suspension component.

In some aspects, the load member restricts a rearward movement of the bushing of the suspension component causing the bolt to rupture upon application of the load to the vehicle due to the impact event.

In some aspects, the load member is fixedly coupled to the first frame member and the second frame member and the bushing of the suspension component separates from the second frame member upon rupture of the bolt upon application of the load to the vehicle due to the impact event.

In some aspects, the first frame member is positioned higher than the second frame member.

In some aspects, the first frame member is a longitudinal frame member and the second frame member is a lower control arm attachment bracket.

In some aspects, the first attachment point is forward of and higher than the second attachment point.

In some aspects, in response to application of a small offset frontal impact to the vehicle, the load member couples the first frame member and second frame member to enable the suspension component to move in an outward direction relative to the vehicle body axis.

In another aspect of the present disclosure, an automotive vehicle includes a vehicle body structure having a vehicle body axis and a vehicle frame arranged along the vehicle body axis. The vehicle body structure defines a passenger compartment and the vehicle frame includes a first frame member and a second frame member coupled to the first frame member. The vehicle frame supports a wheel. A suspension component is coupled to the wheel and includes a control arm, a bushing, and a bolt coupling the suspension component to the second frame member. A load member is coupled to the first frame member at a first attachment point and coupled to the second frame member at a second attachment point. The load member extends generally longitudinally along the vehicle body axis. The suspension component is coupled to the second frame member at the second attachment point and is detachable from the second frame member upon application of a load to the vehicle due to an impact event.

In some aspects, the load member defines a load path between the first frame member and the bushing of the suspension component.

In some aspects, the load member restricts a rearward movement of the bushing of the suspension component causing the bolt to rupture upon application of the load to the vehicle due to the impact event.

In some aspects, the load member is fixedly coupled to the first frame member and the second frame member and the bushing of the suspension component separates from the second frame member upon rupture of the bolt upon application of the load to the vehicle due to the impact event.

In some aspects, the first frame member is positioned higher than the second frame member.

In some aspects, the first frame member is a longitudinal frame member and the second frame member is a lower control arm attachment bracket.

In some aspects, the first attachment point is forward of and higher than the second attachment point.

In some aspects, in response to application of a small offset frontal impact to the vehicle, the load member couples the first frame member and second frame member causing the bolt to rupture to enable separation of the bushing from the second frame member such that the suspension component moves in an outward direction relative to the vehicle body axis and the wheel is directed away from the passenger compartment.

In another aspect of the present disclosure, a load impact management system for an automotive vehicle is disclosed. The automotive vehicle has a vehicle body structuring defining a passenger compartment and a vehicle frame supporting a suspension component and a wheel. The vehicle frame includes a first frame member and a second frame member coupled to the first frame member. The vehicle frame extends along a vehicle body axis. The load impact management system includes a load member coupled to the first frame member at a first attachment point and coupled to the second frame member at a second attachment point. The load member extends generally longitudinally along the vehicle body axis. In response to a small overlap frontal impact to the vehicle, the load member couples the first frame member and second frame member to enable the suspension component to move in an outward direction relative to the vehicle body axis such that the wheel is directed away from the passenger compartment.

In some aspects, the suspension component includes a control arm, a bushing, and a bolt coupling the suspension component to the second frame member and the load member restricts a rearward movement of the bushing of the suspension component causing the bolt to rupture upon the small overlap frontal impact to the vehicle.

In some aspects, the load member is fixedly coupled to the first frame member and the second frame member and the bushing of the suspension component separates from the second frame member upon rupture of the bolt upon the small overlap frontal impact to the vehicle.

In some aspects, the first frame member is a longitudinal frame member and the second frame member is a lower control arm attachment bracket.

BRIEF DESCRIPTION OF THE DRAWINGS

The present disclosure will be described in conjunction with the following figures, wherein like numerals denote like elements.

Figure 1:
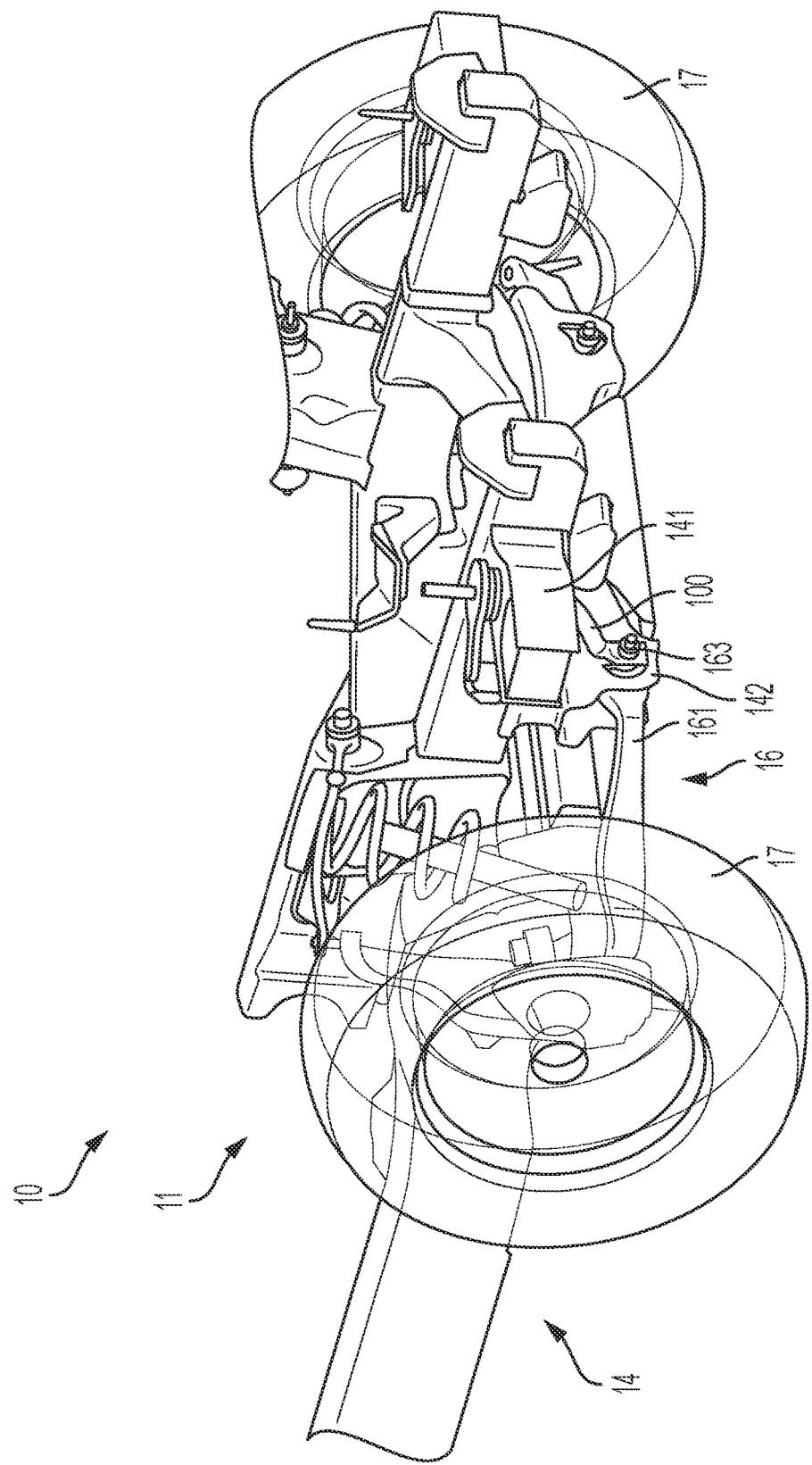
FIG. 1 is a front perspective schematic partial view of a vehicle having a load member, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "Left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof and words of similar import.

In various embodiments, as discussed herein, a load member establishes a load path to transfer an applied load, such as a small offset frontal (SOF) impact, from a vehicle frame to a front bushing of a suspension component. The embodiments discussed herein have no influence on suspension service load but act to transfer load to the front bushing such that the bolt coupling the suspension component to the vehicle frame ruptures. The rupture of the bolt enables the suspension component, and thereby the wheel of the vehicle, to move outward relative to the vehicle body axis, reducing the wheel incursion into the passenger compartment of the vehicle. Furthermore, embodiments discussed herein can be adapted for use with many vehicle architectures.

Figure 2:
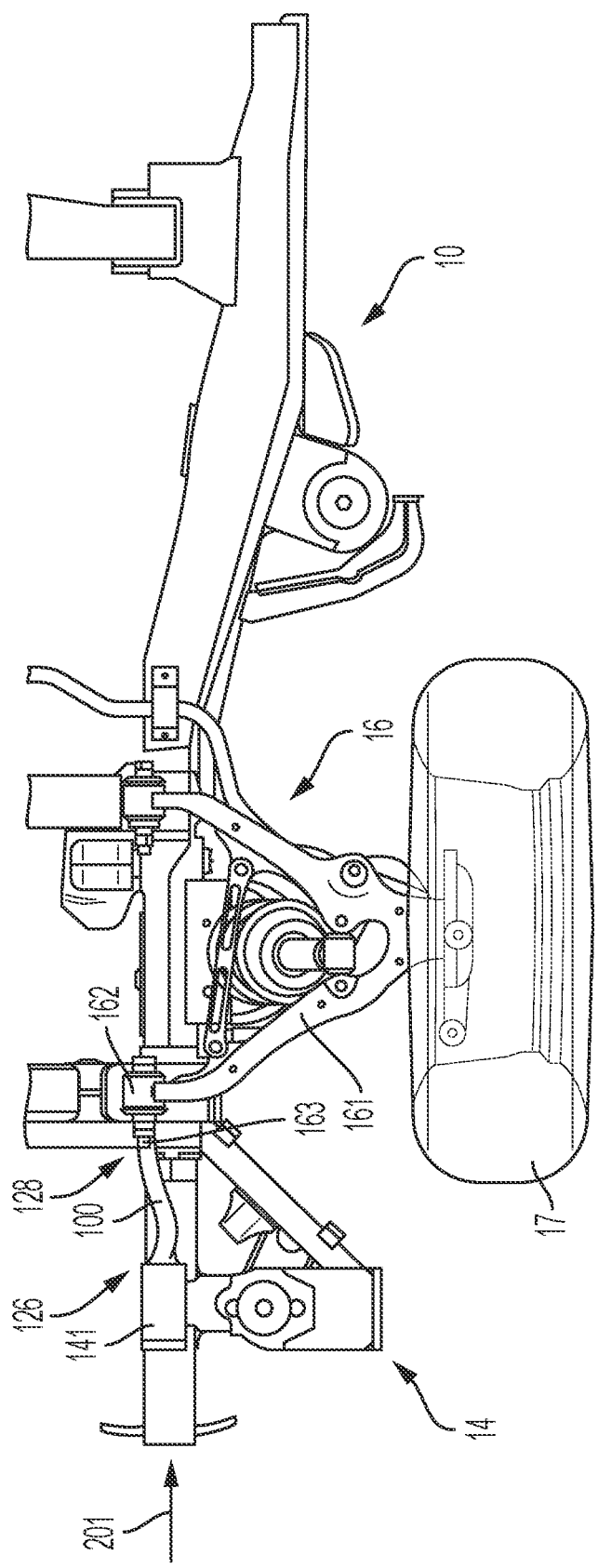
FIG. 2 is a top schematic partial view of the vehicle of FIG. 1, according to an embodiment.
Figure 3:
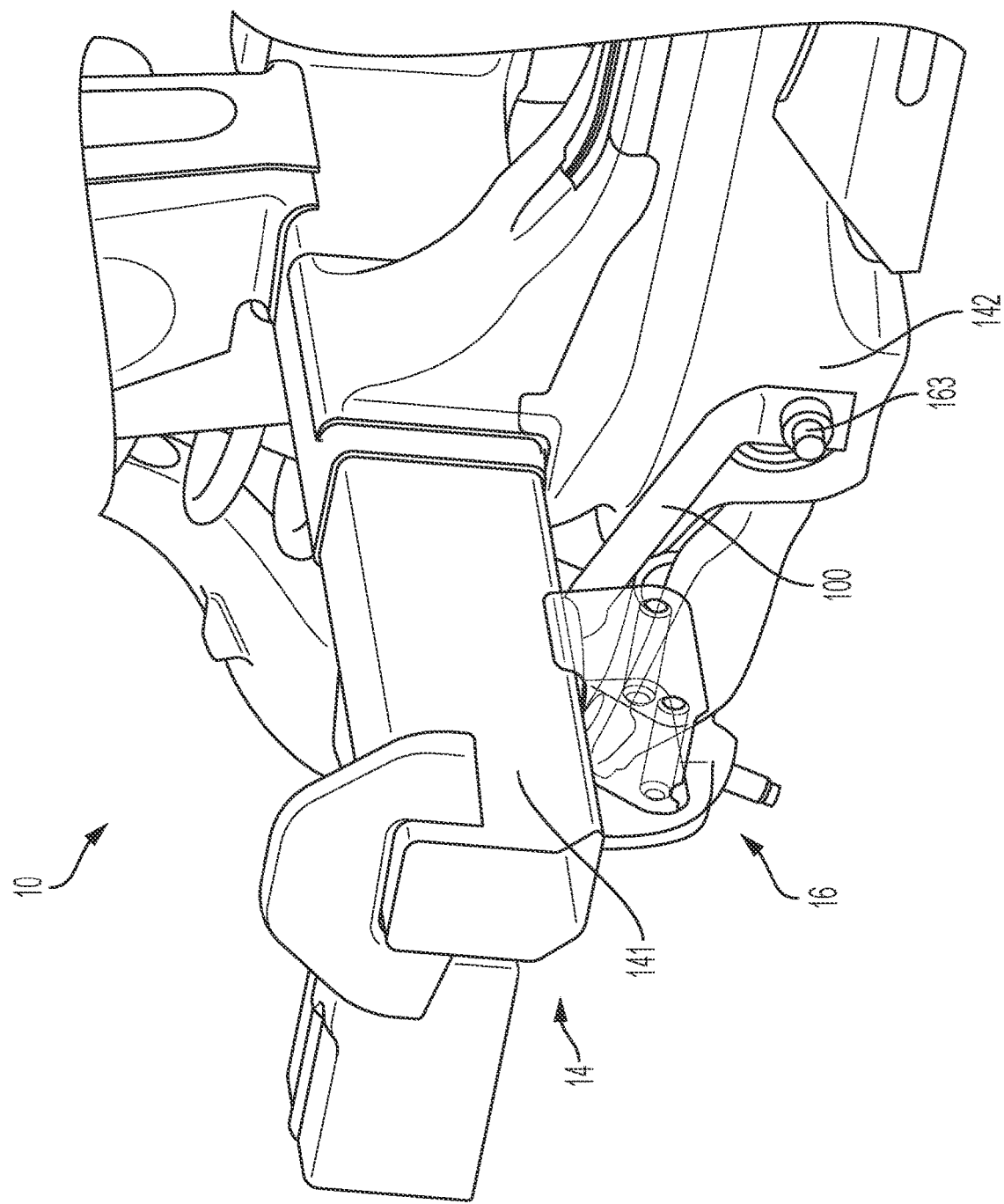
FIG. 3 is a front perspective schematic partial view of the vehicle of FIG. 1, illustrating the attachment points of the load member, according to an embodiment.
Figure 4:
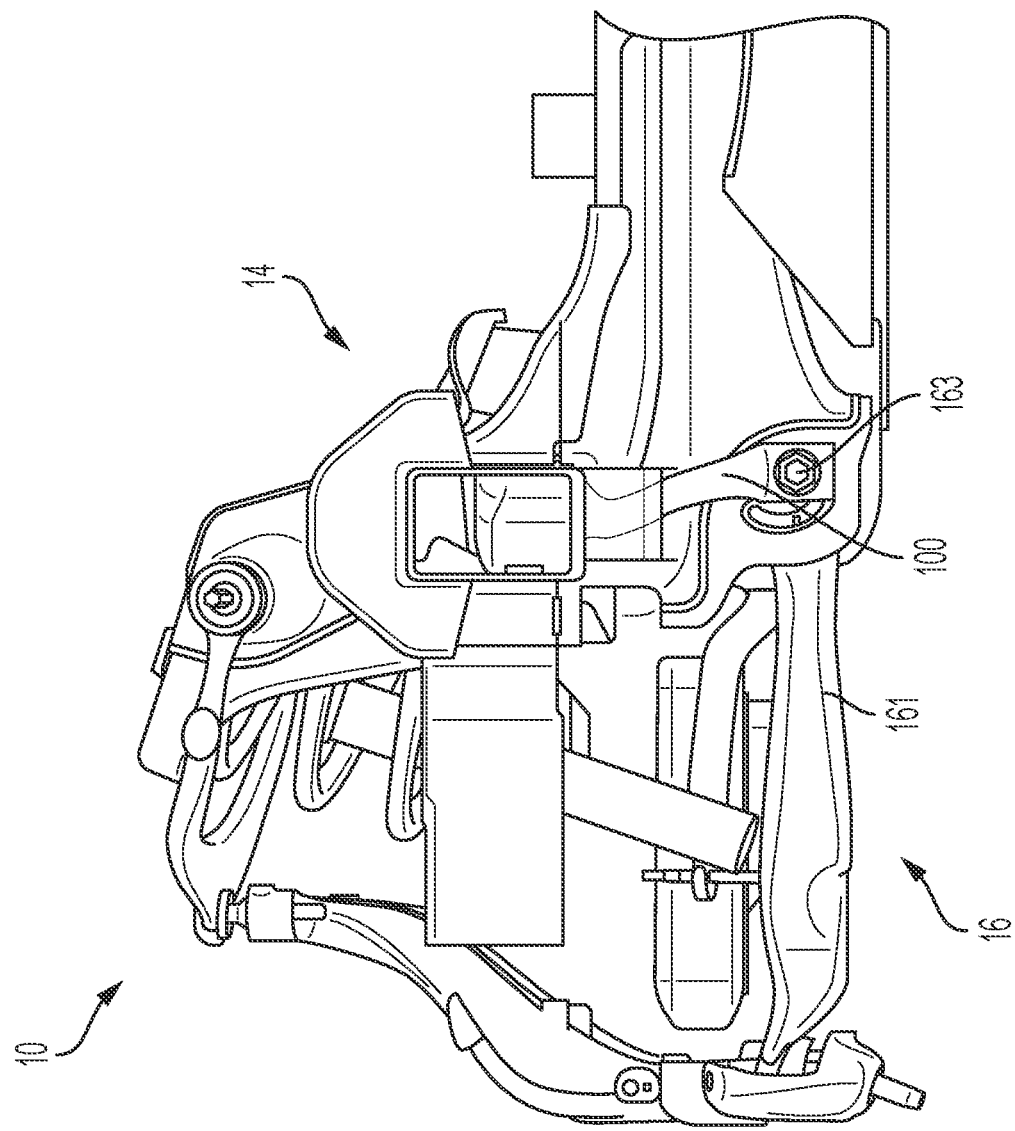
FIG. 4 is a front schematic partial view of the vehicle of FIG. 1, further illustrating the attachment points of the load member, according to an embodiment.
Figure 5:
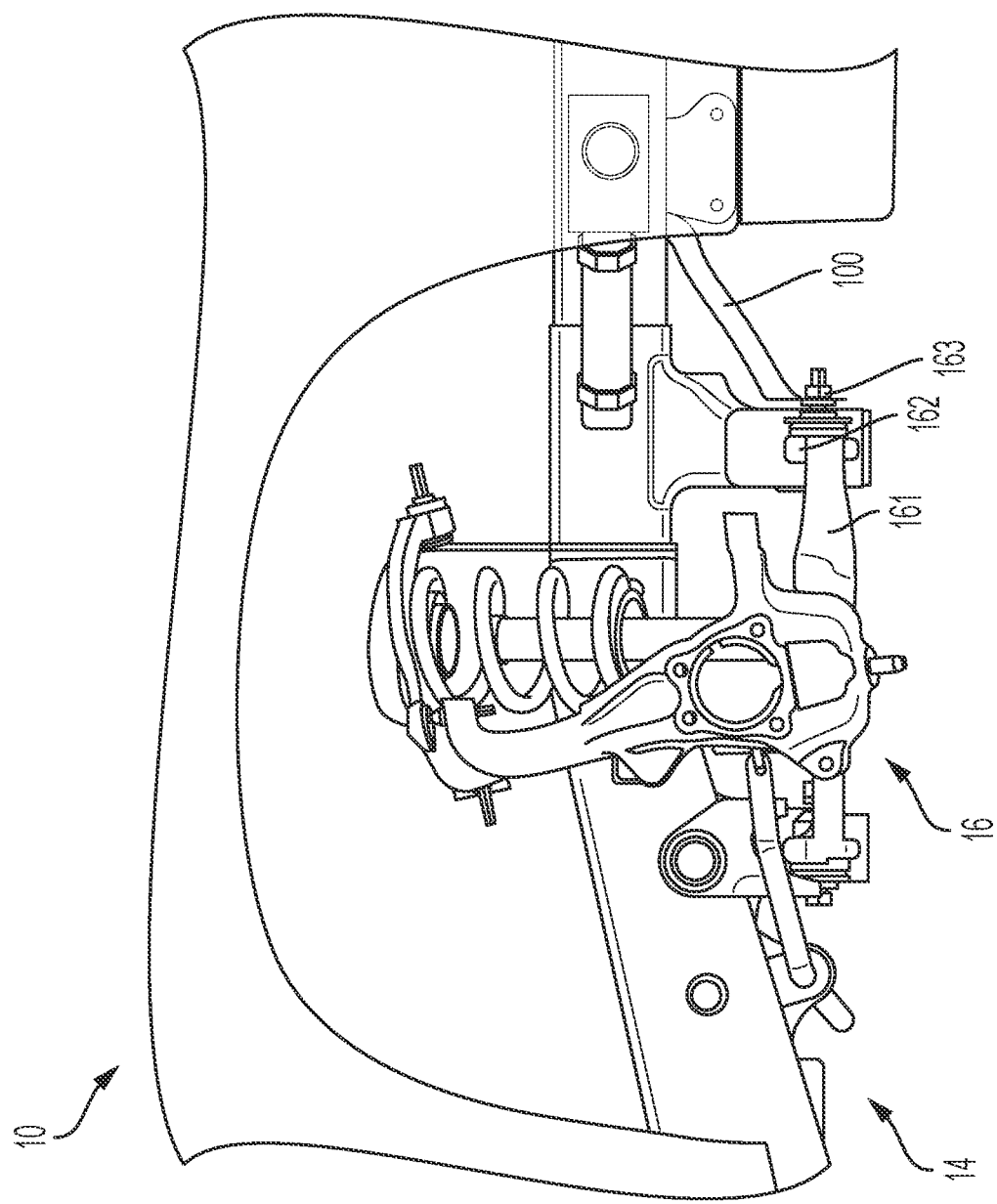
FIG. 5 is a side schematic partial view of the vehicle of FIG. 1, further illustrating the suspension component and load member attachment to the vehicle frame, according to an embodiment.

Referring to the drawings, wherein like reference numbers refer to like components, FIG. 1 is a side schematic partial view of a vehicle 10 having a vehicle body structure (not shown) enclosing a passenger compartment 11, and FIG. 2 is a top schematic partial view of the vehicle 10. The vehicle body structure is constructed from a number of components, such as exterior body panels (not shown), sub-structures, and a frame 14. The vehicle 10 is characterized by a longitudinal vehicle centerline or vehicle body axis that generally coincides with an X-axis and is orthogonal to a Y-axis. In various embodiments, the vehicle 10 is a body-on-frame construction.

The frame 14 enables a support structure for a vehicle suspension component 16 and wheels 17, while also supporting vehicle subsystems, such as a steering system, and a powertrain (not shown). As shown in FIGS. 1 and 2, the frame 14 is arranged in the general plane of the vehicle 10, substantially defined by the X and Y axes. The frame 14 includes a first frame member 141 and a second frame member 142. As appreciated by those skilled in the art, the disclosed vehicle 10 may be a rear-wheel drive, a front-wheel drive, or a four-wheel drive configuration. In various embodiments, the suspension component 16 includes a lower control arm 161, a bushing 162, and a bolt 163 coupling the lower control arm 161 to the second frame member 142. In various embodiments, the second frame member 142 is a lower control arm attachment bracket coupled to the frame 14.

FIGS. 1-5 also illustrate a load member 100. The load member 100 is, in some embodiments, a structural member that creates a new load path by connecting the first frame member 141 and the second frame member 142 of the frame 14. With reference to FIG. 2, the load member 100 is fixedly coupled to the first frame member 141 at a first attachment point 126 and to the second frame member 142 at a second attachment point 128. The lower control arm 161 of the suspension component 16 is also coupled to the second frame member 142 at the second attachment point 128, with the bolt 163 coupling the lower control arm 161 and the second frame member 142. The bolt 163 passes through the bushing 162, the second frame member 142 and the load member 100 and is secured by any means, such as a nut, for example. In various embodiments, the load member 100 is secured to the first frame member 141 using any type of mechanical fastener, such as a bolt, screw, etc., for example and without limitation. In various embodiments, the load member 100 extends along the longitudinal or vehicle body axis of the vehicle 10. In various embodiments, the load member 100 is positioned such that the first attachment point 126 is forward of and higher than the second attachment point 128 due to the structural arrangement of the first frame member 141 and the second frame member 142.

In response to a small overlap frontal impact event, as illustrated by the arrow 201 in FIG. 2, the first frame member 141 deforms and moves outward and/or upward. The load is transferred through the load member 100 to the second frame member 142. As the load is transferred from the frame 14 to the bushing 162, the load member 100 restricts rearward movement of the bushing 162 and causes the bolt 163 to rupture such that the bushing 162 of the suspension 16 separates from the frame 14. The load path established by the load member 100 utilizes the deformation of the first frame member 141 to deflect the load imparted by the small overlap frontal impact event by causing the bolt 163 to rupture and the bushing 162 to separate from the frame, causing the wheel 17 to rotate outward to reduce or minimize intrusion of vehicle components into the passenger compartment 11.

While one load member 100 is illustrated on one side of the vehicle 10, it is understood that other embodiments include a second load member 100 installed on the opposite or other side of the vehicle 10.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A structural arrangement for a vehicle, comprising:
   a vehicle frame including a first frame member and a second frame member coupled to the first frame member, the vehicle frame extending along a vehicle body axis;
   a suspension component including a control arm, a bushing, and a bolt coupling the suspension component to the second frame member; and
   a load member coupled to the first frame member at a first attachment point and coupled to the second frame member at a second attachment point, the load member extending generally longitudinally along the vehicle body axis and defining a load path between the first frame member and the bushing;
   wherein the suspension component is coupled to the second frame member at the second attachment point and is detachable from the second frame member upon application of a load to the vehicle due to an impact event, and wherein the load member restricts a rearward movement of the bushing to thereby cause the bolt to rupture upon the application of the load.

2. The structural arrangement for the vehicle of claim 1, wherein the load member is fixedly coupled to the first frame member and the second frame member and the bushing of the suspension component separates from the second frame member upon rupture of the bolt upon application of the load to the vehicle due to the impact event.

3. The structural arrangement for the vehicle of claim 1, wherein the first frame member is positioned higher than the second frame member.

4. The structural arrangement for the vehicle of claim 1, wherein the first frame member is a longitudinal frame member and the second frame member is a lower control arm attachment bracket.

5. The structural arrangement for the vehicle of claim 1, wherein the first attachment point is forward of and higher than the second attachment point.

6. The structural arrangement for the vehicle of claim 1, wherein in response to application of a small offset frontal impact to the vehicle, the load member couples the first frame member and second frame member to enable the suspension component to move in an outward direction relative to the vehicle body axis.

7. An automotive vehicle, comprising:
a vehicle body structure having a vehicle body axis and a vehicle frame arranged along the vehicle body axis, the vehicle body structure defining a passenger compartment and the vehicle frame including a first frame member and a second frame member coupled to the first frame member, the vehicle frame supporting a wheel;
a suspension component coupled to the wheel and including a control arm, a bushing, and a bolt coupling the suspension component to the second frame member; and
a load member coupled to the first frame member at a first attachment point and coupled to the second frame member at a second attachment point, the load member extending generally longitudinally along the vehicle body axis;
wherein the suspension component is coupled to the second frame member at the second attachment point and is detachable from the second frame member upon application of a load to the vehicle due to an impact event, and
wherein in response to the impact event resulting in an application of a small offset frontal impact to the vehicle, the load member couples the first frame member and second frame member causing the bolt to rupture to enable separation of the bushing from the second frame member, such that the suspension component moves in an outward direction relative to the vehicle body axis and the wheel is directed away from the passenger compartment.

8. The automotive vehicle of claim 7, wherein the load member defines a load path between the first frame member and the bushing of the suspension component.

9. The automotive vehicle of claim 8, wherein the load member restricts a rearward movement of the bushing of the suspension component causing the bolt to rupture upon application of the load to the vehicle due to the impact event.

10. The automotive vehicle of claim 7, wherein the load member is fixedly coupled to the first frame member and the second frame member and the bushing of the suspension component separates from the second frame member upon rupture of the bolt upon application of the load to the vehicle due to the impact event.

11. The automotive vehicle of claim 7, wherein the first frame member is positioned higher than the second frame member.

12. The automotive vehicle of claim 7, wherein the first frame member is a longitudinal frame member and the second frame member is a lower control arm attachment bracket.

13. The automotive vehicle of claim 7, wherein the first attachment point is forward of and higher than the second attachment point.

14. A load impact management system for an automotive vehicle having a vehicle body structuring defining a passenger compartment and a vehicle frame supporting a suspension component and a wheel, the suspension component including a control arm, a bushing, and a bolt coupling the suspension component to the second frame member, the vehicle frame including a first frame member and a second frame member coupled to the first frame member, the vehicle frame extending along a vehicle body axis, the system comprising a load member coupled to the first frame member at a first attachment point and coupled to the second frame member at a second attachment point, and the load member extending generally longitudinally along the vehicle body axis; wherein in response to a small overlap frontal impact to the vehicle, the load member couples the first frame member and second frame member to enable the suspension component to move in an outward direction relative to the vehicle body axis such that the wheel is directed away from the passenger compartment, wherein the load member restricts a rearward movement of the bushing, thereby causing the bolt to rupture upon the small overlap frontal impact.

15. The load impact management system of claim 14, wherein the load member is fixedly coupled to the first frame member and the second frame member and the bushing of the suspension component separates from the second frame member upon rupture of the bolt upon the small overlap frontal impact to the vehicle.

16. The load impact management system of claim 14, wherein the first frame member is a longitudinal frame member and the second frame member is a lower control arm attachment bracket.

17. The structural arrangement for the vehicle of claim 1, wherein the first frame member is a longitudinal frame member.

18. The structural arrangement for the vehicle of claim 1, wherein the second frame member is a lower control arm attachment bracket.

19. The automotive vehicle of claim 7, wherein the first frame member is a longitudinal frame member.

20. The automotive vehicle of claim 7, wherein the second frame member is a lower control arm attachment bracket.

21. The load impact management system of claim 14, wherein the first frame member is positioned higher than the second frame member.

* * * * *